Dec. 17, 1935.  C. L. BLACKBURN  2,024,815
FLUID LEVEL INDICATOR
Filed Dec. 14, 1932     4 Sheets-Sheet 1

INVENTOR.
C. L. BLACKBURN.
BY
ATTORNEYS.

Dec. 17, 1935.  C. L. BLACKBURN  2,024,815
FLUID LEVEL INDICATOR
Filed Dec. 14, 1932  4 Sheets-Sheet 2

INVENTOR.
C. L. BLACKBURN.
BY
Blair & Kilcoyne.
ATTORNEYS.

INVENTOR
C. L. BLACKBURN.
BY
Blair & Kilcoyne.
ATTORNEYS

Patented Dec. 17, 1935

2,024,815

UNITED STATES PATENT OFFICE 2,024,815

FLUID LEVEL INDICATOR

Charles Lord Blackburn, London, England, assignor to Electrical Improvements Limited, Newcastle-on-Tyne, England, a registered company of Great Britain Application December 14, 1932, Serial No. 647,283
In Great Britain December 18, 1931

10 Claims. (Cl. 73—54)

This invention relates to liquid level indicating arrangements of the transparent gauge type, wherein an indication of the liquid level is obtained at a distant observing point owing to the difference between the refractive indices of the liquid and of the gas or vapour above it. Although not limited thereto, the invention is more especially applicable to the indication of the water level in high pressure boilers or steam generators having high combustion chambers, wherein it is desired to render the indication readily visible on the firing floor which is often thirty or more feet below the level at which the gauge must be installed. In such arrangements difficulty is experienced in obtaining a satisfactory indication owing to the fact that when the gauge includes glass or like prisms in contact with the water and steam column the surfaces of such prisms rapidly become etched or defaced to such an extent as to interfere with the indications obtained. Moreover in cases where the gauge itself is directly viewed, it becomes almost impossible to distinguish the brightly illuminated parts of the gauge from the relatively dark parts except at comparatively short distances from the gauge.

The primary object of the present invention is to provide a simple practical construction of gauge which will enable such difficulties to be avoided. To this end the liquid level indicating arrangement according to the invention employs a transparent liquid level gauge such that two rays of light incident on the gauge respectively above and below the liquid level will be deflected by the gauge through different angles. Thus the gauge may comprise a box-like casing having openings in its front and rear walls and vertical transparent prisms or plates for enclosing within the casing a wedge-shaped central space containing the liquid column whose level is to be measured.

A further object of the invention is to provide a convenient arrangement of corrosion-resisting sheets within the gauge for preventing interference with the indications resulting from etching of the gauge surfaces.

Another object of the invention is so to arrange the gauge in association with a projection arrangement for throwing an image of the gauge on a diffusing screen, as to avoid risk of misinterpretation of the indication, more especially at times when the liquid level has fallen to the bottom of the gauge.

Still further objects of the invention are so to illuminate the gauge as to enable a clear and definite indication to be obtained by direct observation at a considerable distance without the use of a projecting arrangement, and further to provide means whereby such indication can be obtained over a wide angle of vision whether viewed more or less horizontally or at a considerable angle to the horizontal.

Some convenient practical arrangements according to the invention are illustrated by way of example in the accompanying drawings, in which.

These arrangements will, for convenience, be described with reference to the indication of the water level in a high pressure steam boiler having a high combustion chamber, wherein it is desired to observe the indications of the gauge from the firing floor which may be thirty feet or more below the gauge.

Figure 1:
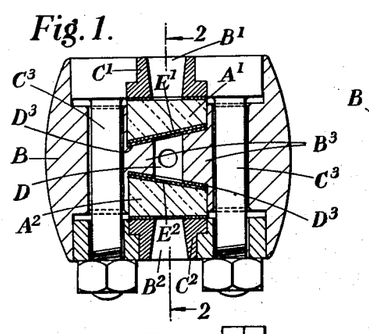
Figures 1 and 2 are respectively horizontal and vertical sections through one construction of liquid level gauge, Figure 2 being a section on the line 2—2 of Figure 1, and being drawn on a smaller scale, Figures 3-5 respectively show horizontal sections of alternative constructions of gauge.
Figure 2:
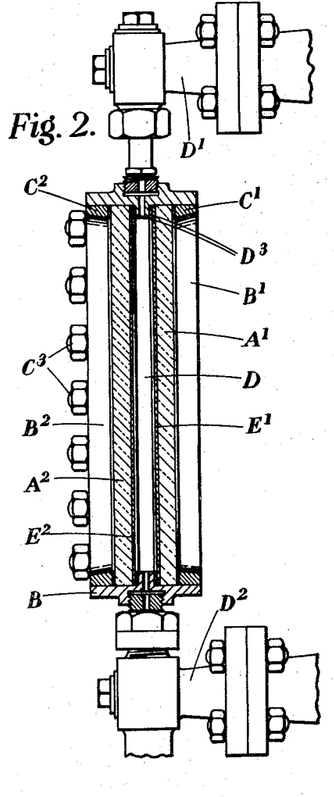

In the construction of gauge shown in Figures 1 and 2, two prisms $A^1$, $A^2$ of glass or other suitable material are mounted vertically in a box-like structure B having openings B¹, B² in its front and back walls adjacent to the prisms for the passage of the light. The prisms are clamped against internal shoulders B³ in the box by means of insets C¹, C² which are forced against the prisms by bolts C³. The central space D between the inner surfaces of the prisms A¹, A² is connected by valve-controlled conduits D¹, D² at the upper and lower ends of the box respectively to the steam space and the water space of the boiler, and suitable packing material D³ is provided around the edges of the inner surfaces of the prisms to render the central space fluid-tight. Sheets E¹, E² of mica or other corrosion-resisting material are provided between the inner surfaces of the prisms A¹, A² and the central space D containing the steam and water column, these sheets being in close contact over the whole surface with the glass or other material of which the prisms are made.

The inner surfaces of the prisms A¹, A², and consequently also the mica sheets E¹, E², are inclined to one another at a small angle, so that the water and steam column in the central space D is itself prismatic in shape. The actual angle of the wedge formed by the central space D may vary, but where very high pressures have to be withstood, it is desirable to keep the wedge angle small in order to avoid setting up heavy shear stresses in the mica sheets. When a projecting arrangement is used, it will usually be satisfactory to employ a wedge-angle of, say, 10°, but when the gauge is to be directly viewed a larger angle of, say, 20° is preferable. In the arrangement shown in Figures 1 and 2 the wedge angle is 20°, the two prisms A¹, A² being similar in shape with their outer surfaces parallel to one another and their inner surfaces inclined at an angle of 10° to the outer surfaces. A 10° wedge may be obtained by using two prisms each having a 5° angle.

Figure 3:
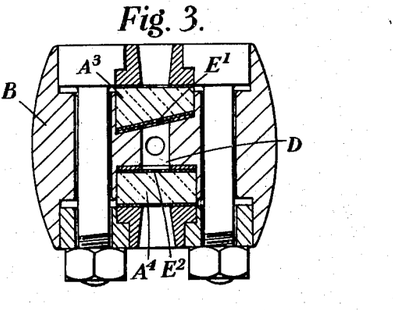

Instead of employing two similar prisms A¹, A² as in Figures 1 and 2, a similar effect may be obtained, as shown in Figure 3, by making one of the prisms in the form of a parallel-sided flat plate A⁴, the other prism A³ having its outer surface parallel to the surfaces of the plate A⁴ and its inner surfaces inclined thereto at the desired wedge angle. In the example shown in Figure 3, the wedge angle is 10°. In other respects, the construction of Figure 3 is similar to that of Figures 1 and 2.

Figure 4:
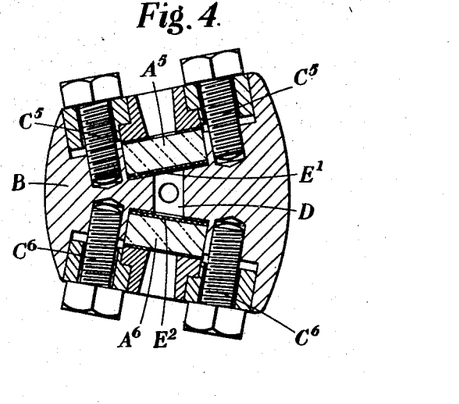

In a further modification shown in Figure 4, two parallel-sided flat plates A⁵, A⁶ are employed, the box B being so shaped that these plates are inclined to one another at the desired wedge angle (20° as shown). This modification necessitates the use of separate clamping screws C⁵, C⁶ in the front and back walls of the box, but the arrangement is otherwise similar to that of Figures 1 and 2.

Figure 5:
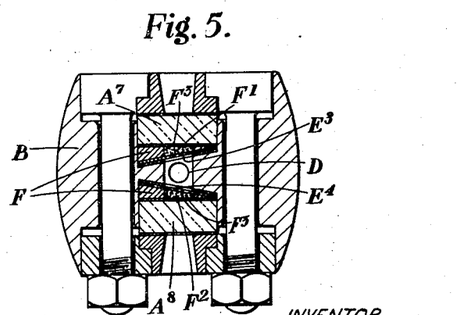

In the foregoing constructions the mica sheets E¹, E² have in each case been arranged to withstand the pressure by being mounted in close contact with the inner surfaces of the prisms, but it is in some instances preferable to separate one or each of the mica sheets from the adjacent prism. Figure 5 illustrates one such arrangement in which the two mica sheets E³, E⁴ are separated from parallel-sided plates A⁷, A⁸ mounted parallel to one another by means of wedge-shaped distance pieces F, so that the two mica sheets are inclined to one another at the desired wedge angle (20° as shown). The small pockets F¹, F² between the mica sheets and the glass plates are preferably filled with liquid, but in order to keep the mica sheets flat, it is necessary to equalize the pressures on the two sides of each sheet. This may be satisfactorily effected in some instances by providing a small hole F³ through the mica sheet at its upper end (the section shown in Figure 5 being assumed as taken through the gauge near its upper end), so that the space behind the sheet becomes filled with the water of condensation.

The gauge may be constructed in other ways, the essential characteristic being that the central space containing the steam and water column shall be in the form of a small angle wedge or its equivalent, so that a beam of light substantially confined to a vertical plane and incident more or less perpendicularly on the outer surface of the first prism will be refracted at slightly different angles through the water and through the steam, so that two flat beams of light respectively above and below the water level will emerge from the gauge and will diverge from one another at a small angle.

Figure 6:
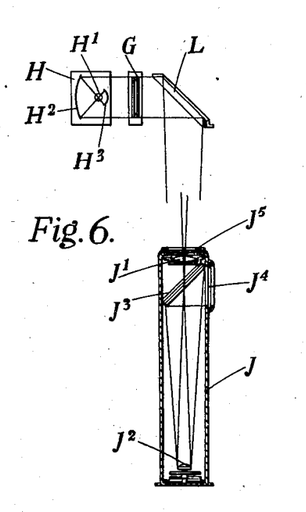
Figures 6 and 7 are diagrammatic views of two alternative forms of an optical projecting arrangement for projecting an image of the gauge to a distance.
Figure 7:
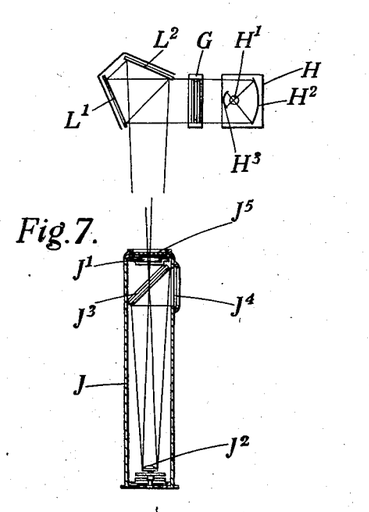
Figure 8:
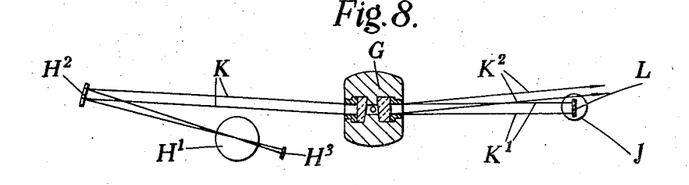
Figure 8 is a diagrammatic plan view illustrating the paths of the rays through the gauge in the projecting arrangement of Figure 6, Figures 9 and 10 are two diagrammatic views similar to that of Figure 8 but taken respectively below and above the liquid level of a modified arrangement employing two different colours.

In cases where the indications of the gauge are to be reproduced at a convenient position on the firing floor, it is preferred to use the optical projecting arrangement forming the subject of the present applicant's copending United States of America patent application Serial No. 632,027. Figures 6–8 illustrates diagrammatically a preferred form of such a projecting arrangement.

This arrangement comprises broadly in addition to the gauge G itself (assumed to be of the form shown in Figures 1 and 2 but with a wedge angle of 10°), an illuminating unit H including the source of light H¹, a paraboloidal condensing mirror H² and a spherical reflector H³, a projection unit J mounted on the firing floor and including a convex projecting lens J¹, a convex mirror J², an inclined plane mirror J³ and a diffusing screen J⁴, and one or more plane mirrors L for deflecting the chosen emergent beam from the gauge G vertically down to the projection unit J.

Since the image is inverted by the projecting lens J¹ and is also twice reflected in the projection unit J, a single plane mirror L (Figure 6) inclined at an angle of 45° to the vertical will serve to give an erect image of the gauge on the screen J⁴ in cases where the mirror L is disposed in front of the gauge and the screen is viewed from the front. A pair of plane mirrors L¹, L² (Figure 7) inclined to one another at an angle of 45° will however be required in cases where the mirrors L¹, L² are located behind the gauge and the screen J⁴ is viewed from the front. The plane mirror L or mirrors L¹, L² in each case consist of narrow vertical strips of a width sufficient to reflect the whole of the chosen beam K¹. It is not essential that the mirror or mirrors should lie out of the path of the second emergent beam K², provided that this beam does not impinge on the projecting lens J¹.

With the above described construction it will be understood that the mirror L or the mirrors L¹ and L² together with their respective projecting units J may be so arranged that the chosen emergent beam will be the only beam projected onto the diffusing screen J⁴. When this structure is utilized with a gauge on which visually distinguishable strips of light are projected in the manner which will hereinafter be described, the parts may be so arranged that only the chosen beams of each strip of light will be projected onto the diffusing screen. Thus it will be apparent that the arrangement provides for projecting onto a suitably located diffusing screen the chosen beam or beams which emerge from a gauge.

This arrangement enables a well-defined and brightly illuminated image of the gauge to be reproduced at eye level on the firing floor in such a manner that it can be readily seen over a wide angle of vision. The lower part of the indication will be brightly illuminated, and the upper part dark, since the upper beam of light $K^2$ emergent from the gauge G does not impinge on the projecting lens $J^1$ and is consequently not reproduced on the diffusing screen $J^4$.

In order to avoid misinterpretation of the indication when the gauge is completely empty, when the whole diffusing screen will be dark, it is preferable to illuminate the gauge by means of two differently coloured or otherwise visually distinguishable substantially flat beams of light which are directed on to the gauge at such angles that the parts of the gauge above and below the water level will appear differently illuminated on the diffusing screen. This can be effected in the arrangement of Figures 6–8 by displacing the lamp $H^1$ slightly to one side of the centre of curvature of the reflector $H^3$ and interposing a colour screen between the lamp and the reflector. There will thus be in effect two point sources of light, one white and one coloured, so that two beams of light in slightly convergent vertical planes are directed on to the gauge, each of which will be separated out by the gauge into two emergent flat beams respectively above and below the water level. By suitably disposing the various elements, it can be arranged that the upper white emergent beam and the lower coloured emergent beam are both incident on the projecting lens $J^1$ and are consequently projected on to the diffusing screen $J^4$. This arrangement is not wholly satisfactory however owing to the different intensities of the white and coloured beams, and it is generally preferable to employ two colours such as red and green so arranged that approximately equal intensities are obtained in the two colours.

Figure 9:
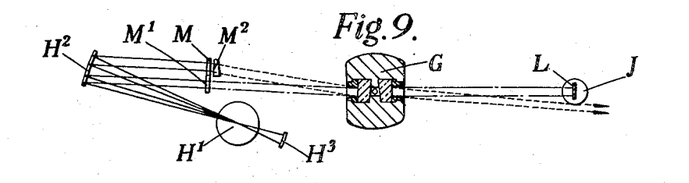
Figure 10:
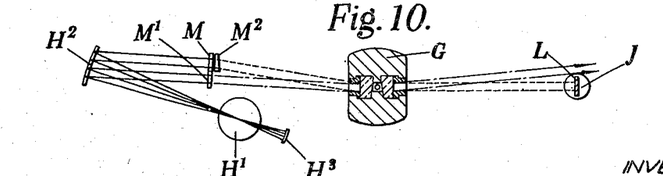

Such an arrangement is illustrated in Figures 9 and 10 and differs from the arrangement of Figures 6–8 in the provision of two colour screens M, $M^1$ respectively red and green, between the condensing mirror $H^2$ and the gauge G. A small prism $M^2$ is disposed in the path of the red rays in order to deflect these rays on to the gauge and the angle of this prism is chosen to suit the wedge angle of the gauge so that the upper red emergent beam lies in the same plane as the lower green emergent beam. The red rays are indicated by dotted lines in the drawings and the green rays by chain lines, Figure 9 showing the paths of the rays below the water level and Figure 10 those of the rays above the water level. Thus the upper red beam and the lower green beam both fall on the projecting lens $J^1$ and the indication on the diffusing screen $J^4$ consists of a red upper part and a green lower part, the water level being indicated by the dividing line between the two parts of the image.

Although described with reference to a boiler installation provided with a water level gauge at a height above the firing floor, the arrangements can be applied with suitable modifications to other purposes. Thus for instance the arrangements may also be employed with advantage in some cases, for example, with pulverized fuel boilers, where the firing floor is commonly at more or less the same height as the gauge, but where the gauge is located at the back of the boiler. The arrangements are generally applicable to liquid level indicating purposes, where it is desired to obtain an indication at a distance from the point at which the gauge is installed.

Again the forms of gauge described may be employed with other arrangements for projecting the indication to a distant point, or they may be directly viewed without a projecting arrangement. In the latter case the apparatus is preferably arranged in the manner shown in Figure 11.

Figure 11:
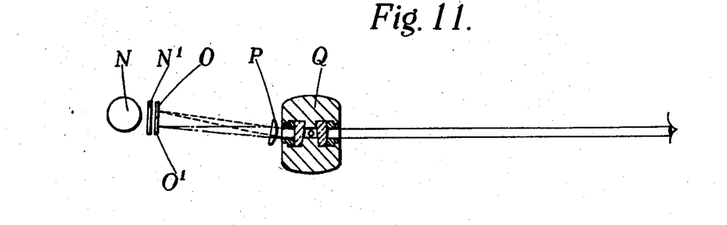
Figure 11 is a diagrammatic plan view of a modified arrangement for use in the case when the gauge is directly viewed.

In this arrangement a vertical strip light N (or series of electric lamps disposed one above the other) is located behind a diffusing screen $N^1$, in front of which two colour screens O $O^1$ (e. g. red and green) are placed side by side, the arrangement being such that substantially even illumination is obtained over the whole area of the colour screens. A cylindrical lens P is located close to the gauge Q (preferably constructed in the manner shown in Figures 1 and 2 with a wedge angle of 20°) in such a position that the colour screens O $O^1$ are in the focal plane of the lens. With this arrangement, what may be termed "flash" illumination of the lens P is obtained, that is to say, if the gauge were removed altogether, the whole of the lens P would appear illuminated in red when viewed from any direction within a certain angle (since all rays leaving the lens in any one such direction will have passed through some point on a vertical line in the red colour screen O) and would similarly appear illuminated in green when viewed from any direction within another contiguous angle. The gauge Q will act in the manner above described to separate out each incident vertical strip of light into two divergent vertical strips respectively above and below the water level. Thus to an observer walking past the gauge, say from the top to the bottom of the drawing, the gauge will first of all appear wholly dark, and then green above the water level and dark below, after which the gauge will appear in turn wholly green, then red above and green below, then wholly red, then dark above and red below, and finally wholly dark. With a suitable width and positioning of the colour screens in relation to the wedge angle of the gauge, the wholly red and wholly green indications can be made to disappear altogether, and a clear indication of the water level over a reasonably wide angle of vision can be satisfactorily obtained. The two colour screens should be chosen to give approximately equal intensities in the beams, and when so chosen, the water level is clearly indicated even at great distances from the gauge (at least within the central portion of the angle of vision where both colours are visible).

Figure 12:
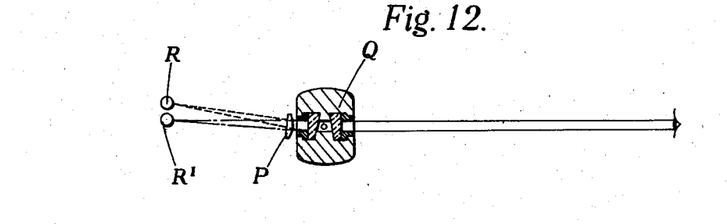
Figures 12-14 are views similar to Figure 11 respectively illustrating three further modified arrangements for direct viewing.

Figure 12 illustrates a modification of the arrangement of Figure 11, in which the strip light and diffusing screen N, $N^1$ and the colour screens O, $O^1$ are replaced by a pair of differently coloured vertical glow discharge tubes R, $R^1$, for example a neon tube and a mercury vapour tube, the arrangement in other respects being similar to that of Figure 11.

Figure 13:
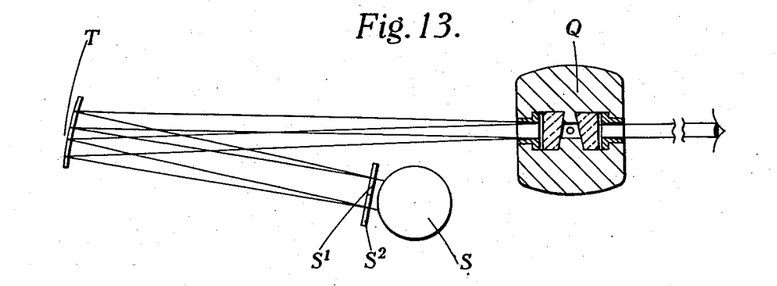

Figure 13 illustrates a further modification of Figure 11, in which an electric lamp S having a diffusing envelope, such for example as the well-known opal or pearl lamps, is employed as the source of light, so that substantially even illumination over a small area is obtained. Red and green colour screens $S^1$, $S^2$ are arranged next to the lamp, so as to lie one on either side of the focus of a paraboloidal mirror strip T similar to the condensing mirror strip H² of Figures 6-10, and the rays reflected from the mirror T are incident directly on the gauge Q. This arrangement gives "flash" illumination of the mirror T and its operation will be clear without further description.

Figure 14:
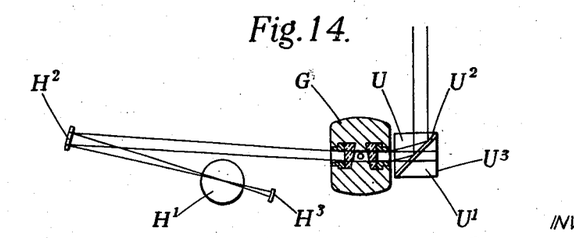

Figure 14 illustrates another alternative arrangement utilizing single colour indication without a projecting arrangement. In this arrangement the gauge is illuminated in a manner similar to that described with reference to Figures 6-8 (the same reference letters being employed). The two emergent beams from the gauge respectively above and below the water level are however in this instance incident on a double prism U, U¹ located immediately next to the gauge. The two prisms U, U¹ have a narrow air space U² between them, the surface of the first prism U adjacent to this air space being arranged at such an angle to the emergent beams from the gauge that the upper emergent beam is totally reflected, whilst the lower emergent beam is refracted and passes through the second prism to the outer surface U³ thereof, which is ground or otherwise formed to act as a diffusing screen. Thus the lower part of the indication appearing on this diffusing screen will be brightly illuminated and the upper part will be dark.

In the direct-viewing arrangements of Figures 11-13 as has already been mentioned, a true indication is obtained only within a definite angle of vision, and moreover this angle of vision is relatively narrow owing to the fact that all the rays emanating from a single vertical line in the colour screen emerge from the gauge parallel to one another. It is often found preferable however to cut off the outer parts of the field of vision to avoid possible misinterpretation of the indications, and one convenient practical arrangement for effecting this has the further advantage of enabling the indications to be obtained over a relatively wide angle of vision. This arrangement involves the use in association with the gauge of an optical system, an illuminating device comprising one or more sources of light or an illuminated screen so arranged as to form two differently coloured or otherwise visually distinguishable vertical strips, and a vertically slotted mask or shutter, the illuminating device and the mask being substantially located in planes passing through conjugate foci of the optical system and being so arranged that an observer viewing the gauge through the mask will see the part of the gauge above the liquid level illuminated from one of the vertical strips and the part below the liquid level illuminated from the other vertical strip.

Figures 15, 16, 17, 18, 19:
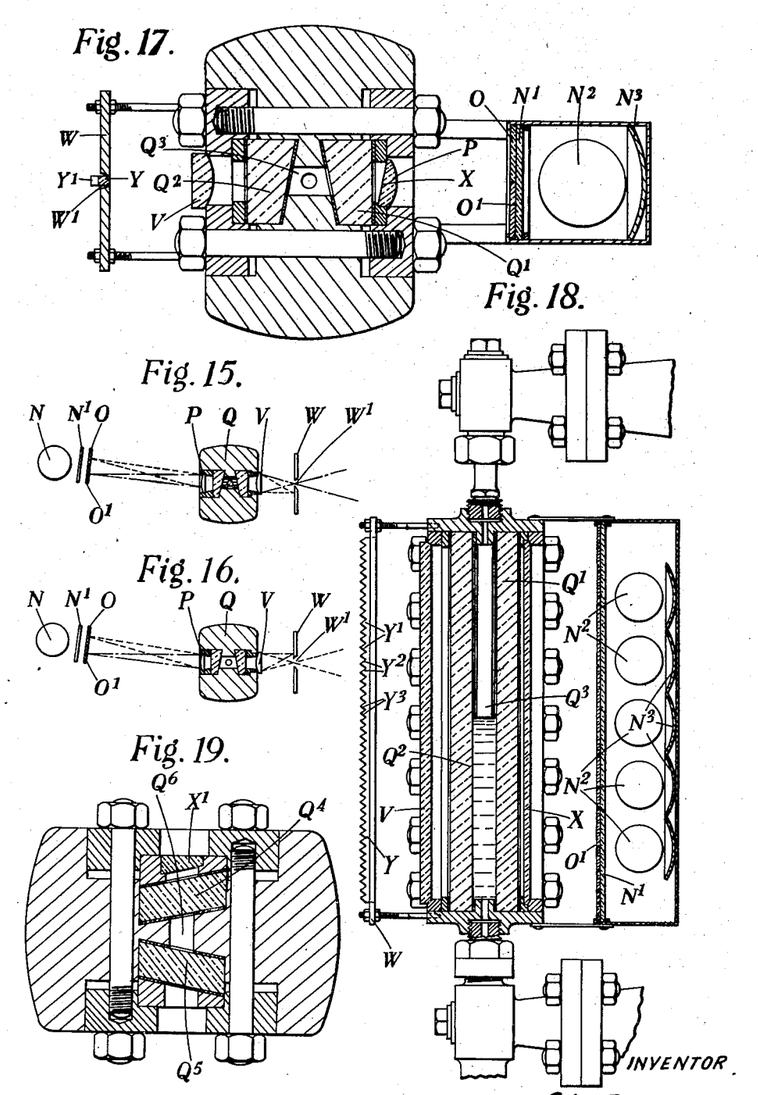
Figures 15 and 16 are diagrammatic plan views of a further modification of the arrangement of Figure 11 and respectively showing the paths of the rays below and above the liquid level.
Figures 17 and 18 are horizontal and vertical sectional views showing a further modified construction of gauge with its associated elements arranged for direct viewing.
Figure 19 shows in horizontal section yet another gauge construction.

An arrangement of this kind is illustrated in Figures 15 and 16 which respectively show the paths of the rays below and above the liquid level. In this arrangement the gauge and the means for illuminating the gauge are similar to the corresponding parts of the arrangement of Figure 11 and the same reference letters are employed. A second cylindrical lens V is mounted vertically in the path of the emergent rays from the gauge Q and a mask W having a vertical slot W¹ adjustable in width and position is located in the focal plane of this second lens V. Thus the colour screens O O¹ and the mask W are in conjugate focal planes of the optical system formed by the two lenses P, V. With this arrangement two astigmatic images of the colour screens O O¹ will be formed in the plane of the mask W, one formed by rays which have passed through the gauge above the water level and the other by rays which have passed through the gauge below the water level, the two images being displaced laterally from one another by an amount dependent on the wedge angle of the gauge. Thus all the rays emanating from one vertical line in a colour screen and passing through the gauge below the water level are focused on a vertical line in the plane of the mask, and those from the same vertical line in the colour screen passing through the gauge above the water level are focused on another vertical line in the plane of the mask. It is to be noted however that the arrangement is astigmatic for there is no focusing in vertical planes. The vertical slot W¹ in the mask is so adjusted that its edges coincide respectively with the two line images of the separating line between the two colour screens O O¹. Thus if the gauge is viewed through the mask from any direction within a definite angle of vision, it will appear, say, red above the water level and green below the water level. As the plane of the mask W is coincident with the image plane of the colour screens O O¹ no parallax effects are introduced, and a clear indication of the water level is obtained even over a considerable angle and at great distances from the gauge. Outside the angle of vision, no light will be seen at all, but by suitably dimensioning the parts of the apparatus, the angle of vision can readily be made large enough for practical purposes. By suitable choice of focal length for the second cylindrical lens V, the permissible width of the slot W¹ may be increased or decreased and the angle of vision correspondingly decreased or increased.

The above arrangement is fully satisfactory so long as the gauge is viewed more or less horizontally. A difficulty however arises when the gauge is viewed at a considerable angle to the horizontal as for example in the case of a boiler with a high combustion chamber when it is desired to view the gauge from the firing floor. For in this case the rays reaching the observer will have passed through the wedge of the gauge at an angle to the horizontal, and consequently will have been deflected by the gauge through a wider angle than rays passing through the gauge horizontally. This increased deviation is of no consequence unless the direction of observation is at a considerable angle to the horizontal, but if the angle is large, it will be apparent that the vertical line images of the separating line between the colour screens O O¹ will no longer coincide with the edges of the slot W¹ in the mask W.

Some degree of compensation for this increased deviation can be obtained by inserting a vertical prism in the path of the rays near the gauge, and Figures 17 and 18 and Figure 19 illustrate two arrangements in which such a prism is employed.

The arrangement of Figures 17 and 18 may be regarded as an improved constructional form of the arrangement of Figures 15 and 16 (the same reference letters being employed where applicable), and is especially intended for the case of a boiler with a high combustion chamber wherein the gauge is to be viewed at a considerable angle, say, 60°, to the horizontal from the firing floor. In this construction the gauge itself is generally similar to that shown in Figure 1 with two glass prisms Q¹ Q², each with a wedge angle of 10° enclosing a central space Q³ with a wedge angle of 20°. The two glass prisms Q¹ Q² of the gauge in this case themselves give over-compensation for the increased deviation in the water and steam prisms, and the compensating prism consequently must have its wedge angle directed in the same direction as that in the central space Q³. In the example illustrated the compensating prism X is formed integral with the first cylindrical lens P, the combined lens and prism P X being mounted in one of the openings in the casing of the gauge. The second cylindrical lens V is mounted in the other opening in the gauge casing, and the mask W, the colour screens O O¹ and the diffusing screen N¹ are arranged generally in the manner shown in Figures 15 and 16, with the exception that (with suitable dimensioning of the compensating prism X) the arrangement can now be made symmetrical with the mask and the colour screens in parallel planes at right angles to the optical axes of both lenses P and V. To permit this, the wedge angle of the prism X is so chosen that the total deviation produced in a ray of light passing through the whole system above the water level is equal and opposite to that produced in a ray below the water level, and this relationship will approximately obtain whatever the inclination of the rays to the horizontal. Thus with ordinary glass suitable for the manufacture of the combined lens and prism P X, a wedge angle of about 14° for the compensating prism X gives the desired result. Figure 18 shows a convenient arrangement for giving even illumination of the diffusing screen N¹ and therefore of the colour screens O O¹, a series of electric lamps N² being mounted one above the other with approximately parabolic reflectors N³ behind them.

Whilst the compensating prism will afford sufficiently accurate compensation for the increased prismatic deviation due to oblique vision, it will not compensate for the errors due to the obliquity of the rays passing through the cylindrical lenses, and where the gauge will normally only be viewed at a considerable angle to the horizontal (as in the case of a boiler with a high combustion chamber) it is preferable to provide a reflecting or refracting device in front of or behind the slot W¹ in the mask. A convenient construction for such a device consists of a vertical glass plate Y of width corresponding to that of the slot W¹, having one of its faces provided with a number of similar horizontal prismatic ribs Y¹. This plate Y may be mounted with its ribbed face turned either towards or away from the gauge. The upper facet Y² of each rib Y¹ is utilized in either case. Thus with the ribs Y¹ turned towards the gauge, horizontal rays from the gauge are refracted downwards at the facets Y² of the ribs Y¹ to the desired angle, whilst with the ribs turned away from the gauge, as shown, the rays will be reflected downwards from the upper facets Y² of the ribs. The ribs must be so arranged as to permit a continuous view of the gauge to be obtained, the lower facets Y³ of the ribs being cut at an angle to allow this. In the example illustrated the upper and lower facets Y² Y³ of each rib are both cut at an angle of 30° to the horizontal, so that horizontal rays from the gauge will be reflected downwards by the upper facets Y² at an angle of 60° to the horizontal and will pass at right angles through the lower facets Y³, a continuous view of the gauge thus being ensured. With this arrangement it will be clear that only the horizontal or nearly horizontal rays through the gauge are used for the indication and the errors due to oblique passage of the rays through the gauge and the lenses do not arise. Moreover the whole length of the gauge is fully illuminated without interference from the top or bottom of the openings in the gauge casing and without the necessity for using illuminated colour screens of greater length than the gauge itself.

It will be appreciated that, notwithstanding the provision of the reflecting or refracting device in the slot in the mask, it is still of advantage to retain the compensating prism X, in view of the fact that this prism enables the colour screens and the mask to be symmetrically disposed with reference to the central plane through the gauge and lenses and thus avoids the necessity for obliquely cutting away the side walls of the openings in the gauge. For this reason, as well as for the partial compensation afforded for the increased deviation due to oblique vision, it is also of advantage to provide the compensating prism in other arrangements according to the invention where the mask and one or both of the cylindrical lenses are omitted. Figure 19 illustrates such an arrangement, and this figure also serves to show the manner in which the compensating prism should be arranged in cases when parallel-sided plates are employed in the gauge in place of oblique-faced prisms.

The construction of gauge shown in Figure 19 is generally similar to that shown in Figure 4, in that it employs two parallel-sided glass plates Q⁴, Q⁵ mounted at an angle (of say 20°) to one another so as to enclose a wedge-shaped central space Q⁶, but by making the plates Q⁴, Q⁵ of parallelogram section, it becomes possible to arrange the gauge casing symmetrically with clamping bolts lying parallel to the central plane through the gauge. The compensating prism X¹ is mounted in one of the openings in the gauge casing, as for the combined lens and prism of Figures 17 and 18, but in this case owing to the use of parallel-sided plates in the gauge, the wedge angle of the compensating prism is directed oppositely to the wedge angle of the central space in the gauge. A wedge angle of about 7° is suitable for the compensating prism X¹ in this case with ordinary glass, this angle being so chosen in relation to the refractive index of the material as to produce a deviation opposite to and approximately midway between the deviations produced by the water prism and by the steam prism in the gauge.

It will be appreciated that the foregoing arrangements have been described by way of example only, and that the invention may be carried into practice in other ways. Thus for example in the arrangements of Figures 15–18, the lenses of the optical system may be replaced by curved mirrors in a manner analogous to that described with reference to Figure 13 and it is also possible to dispense completely with one of the lenses or mirrors, the colour screens and the mask still being located in planes passing through conjugate foci of the single-element optical system. Again other illuminating devices which will produce two visually distinguishable vertical strips of light in the focal plane of the first lens or mirror may be employed in the arrangements of Figures 15–18 in place of the illuminated colour screens, as for instance two differently coloured vertical glow discharge tubes arranged in a manner analogous to that described for Figure 12 or a single strip of light in association with a dark strip at the side of the source of light as in the arrangements of Figures 6–8 and 14.

What I claim as my invention and desire to secure by Letters Patent is:—

1. In a fluid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the fluid in the gauge and at a different angle below the level of the fluid in the gauge, of means for directing two visually distinguishable strips of light on said gauge, said means being so arranged in conjunction with said gauge that when the gauge is viewed from a definite angle the light rays from one strip of light will be visible above the level of the fluid in the gauge but invisible below the level of the fluid in the gauge while the light rays from the other strip of light will be visible below the level of the fluid in the gauge, but invisible above the level of the fluid in the gauge.

2. In a fluid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the fluid in the gauge and at a different angle below the level of the fluid in the gauge, of means for directing two visually distinguishable strips of light on said gauge, said means being so arranged in conjunction with said gauge that the angle of emergence of the light rays from one strip of light above the level of the fluid in the gauge will coincide with the angle of emergence of the light rays from the other strip of light below the level of the fluid in the gauge.

3. In a fluid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the fluid in the gauge and at a different angle below the level of the fluid in the gauge, of means for directing rays of light of two different colors on said gauge, said means being so arranged in conjunction with said gauge that when the gauge is viewed from a definite angle the light rays of one color will be visible above the level of the fluid in the gauge but invisible below the level of the fluid in the gauge while the light rays of the other color will be visible below the level of the fluid in the gauge but invisible above the level of the fluid in the gauge.

4. In a fluid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the fluid in the gauge and at a different angle below the level of the fluid in the gauge, of means for directing rays of light of two different colors on said gauge, said means being so arranged in conjunction with said gauge that the angle of emergence of the light rays of one color above the level of the fluid in the gauge will coincide with the angle of emergence of the light rays of the other color below the level of the fluid in the gauge.

5. In a liquid level indicator, the combination with a gauge having a transparent portion in which the optical properties of the gauge contents and the transparent portion of the gauge are such that of a plurality of light rays directed onto the gauge at least a portion of said rays will be refracted by the transparent portion of the gauge or the gauge contents in such a manner that the rays will emerge from the transparent portion of the gauge or the gauge contents at one angle above the level of the liquid in the gauge and at a different angle below the level of the liquid in the gauge, of means for directing two visually distinguishable types of light rays on said gauge, said means being so arranged in conjunction with said gauge that when the gauge is viewed from a chosen observation point the rays of one character will be visible above the level of the liquid in the gauge but invisible below the level of the liquid in the gauge while the rays of the other character will be visible below the level of the liquid in the gauge but invisible above the level of the liquid in the gauge, and means limiting an operator's view of said gauge to said chosen observation point.

6. In a liquid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the liquid in the gauge and at a different angle below the level of the liquid in the gauge, a source of light for directing light rays on said gauge, and a pair of color screens disposed between said source of light and said gauge whereby rays of light of two different colors will be directed on said gauge throughout the length thereof, said color screens being so arranged in conjunction with said gauge that when the gauge is viewed from a chosen observation point the light rays of one color will be visible above the level of the liquid in the gauge but invisible below the level of the liquid in the gauge while the light rays of the other color will be visible below the level of the liquid in the gauge but invisible above the level of the liquid in the gauge.

7. In a liquid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the liquid in the gauge and at a different angle below the level of the liquid in the gauge, of means for directing two visually distinguishable types of light rays on said gauge, said means being so arranged in conjunction with said gauge that when the gauge is viewed from a chosen angle the light rays of one type will be visible below the level of the liquid in the gauge while the light rays of the other type will be visible above the level of the liquid in the gauge, and a mask so associated with said gauge as to prevent vision of said gauge except at said chosen angle.

8. In a liquid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the liquid in the gauge and at a different angle below the level of the liquid in the gauge, of means for directing two visually distinguishable types of light rays on said gauge, said means being so arranged in conjunction with said gauge that when the gauge is viewed from a chosen angle the light rays of one type will be visible below the level of the liquid in the gauge while the light rays of the other type will be visible above the level of the liquid in the gauge, and a vertical prism so associated with said gauge as to receive the light rays which emerge therefrom at said chosen angle and deflect the same downwardly whereby the line of demarcation between the two visually distinguishable rays of light may be readily observed when said gauge is viewed at an angle to the horizontal.

9. In a liquid level indicator, the combination with a gauge comprising a box-like casing having openings in its front and rear walls, and transparent means for closing said openings, said transparent means operating to enclose within the casing a wedge-shaped central space containing the column of liquid whose level is to be indicated, the optical properties of the gauge contents and the transparent means of the gauge being such that if a beam of light is directed onto the gauge a part of the beam will be refracted by the gauge contents or the transparent means of the gauge in such a manner that the beam will emerge from the transparent means of the gauge or the gauge contents at one angle above the level of the liquid in the gauge and at a different angle below the level of the liquid in the gauge, of a source of light, means for directing the rays of light from said source through the transparent members closing said openings, a pair of color screens disposed between said source of light and said casing, said color screens being so arranged that convergent rays of differently colored light will be directed on said gauge throughout the length thereof in such a manner that when the gauge is viewed from a chosen observation point the light rays of one color will be visible above the level of the liquid in the gauge while the light rays of the other color will be visible below the level of the liquid in the gauge, and a mask associated with said gauge for limiting vision of said gauge to said chosen observation point.

10. In a fluid level indicator, the combination with a gauge having a transparent portion in which the optical properties of the gauge contents and the transparent portion of the gauge are such that of a plurality of light rays directed onto the gauge at least a part of said rays will be refracted by the transparent portion of the gauge or the gauge contents in such a manner that the rays will emerge from the transparent portion of the gauge or the gauge contents at one angle above the level of the fluid in the gauge and at a different angle below the level of the fluid in the gauge, of a source of light for directing rays of light through said gauge, and a transparent color screen through which certain of the light rays pass, said color screen being so arranged as to divide the light rays into two bands extending longitudinally of the gauge, with the light rays of one band differing in color from the light rays of the other band, said screen being so arranged in conjunction with said source of light and said gauge that when the gauge is viewed from a definite angle the light rays of one color will be visible above the level of the fluid in the gauge but invisible below the level of the fluid in the gauge while the light rays of the other color will be visible below the level of the fluid in the gauge but invisible above the level of the fluid in the gauge.

CHARLES LORD BLACKBURN.